United States Patent [19]
Kano

[11] 4,417,789
[45] Nov. 29, 1983

[54] OBSERVATION DEVICE
[75] Inventor: Ichiro Kano, Yokohama, Japan
[73] Assignee: Canon Kabushiki Kaisha, Tokyo, Japan
[21] Appl. No.: 221,634
[22] Filed: Dec. 31, 1980
[30] Foreign Application Priority Data Jan. 17, 1980 [JP] Japan .................................. 55-3923

[51] Int. Cl.$^3$ ............................................ G02B 22/18
[52] U.S. Cl. ................................................. 350/513
[58] Field of Search ....................... 350/30, 31, 33, 35, 350/54, 81, 415

[56] References Cited

U.S. PATENT DOCUMENTS 3,672,778  6/1972  Kern .................................. 350/54 X
3,853,398 12/1974  Kano .................................. 350/81 X
4,009,929  3/1977  Abe et al. ............................ 350/35
4,062,623 12/1977  Suzuki et al. ..................... 350/415 X

FOREIGN PATENT DOCUMENTS 212048 11/1960 Austria ..................................... 350/9

Primary Examiner—William L. Sikes
Assistant Examiner—Matthew W. Koren
Attorney, Agent, or Firm—Fitzpatrick, Cella, Harper & Scinto

[57] ABSTRACT

A device for observing, by use of two microscopes, two adjacent regions on two objects which are superposed with respect to the direction of an optical axis is provided with a magnifying and image projecting lens interposed between the microscopes and the objects. The two microscopes are disposed at a space interval between their optical axes which is greater than the space interval between the two adjacent regions, and the two regions of the magnified object images formed by the image projecting lens is observed through these two microscopes.

4 Claims, 5 Drawing Figures

OBSERVATION DEVICE

BACKGROUND OF THE INVENTION

1. Field of the Invention

This invention relates to an observation device, using a plurality of microscopes for observing a plurality of mutually adjacent regions on at least two objects, which are superposed on each other with respect to the direction of an optical axis.

2. Description of Prior Art

The type of observation device, to which the subject invention relates, may be employed, for example, in the (1) aligning and cementing, with good positional accuracy, a tri-color separation filter such as a stripe filter, etc. onto a solid-state imaging device chip such as a CCD chip of from a few millimeters square to ten or greater millimeters square, or in (2) carrying out an alignment operation before contact, or proximity printing of a mask of the same size as mentioned above onto a very small wafer made of a special crystal such as GaAs, etc. that cannot easily be produced larger than 20 mm square due to difficulty in producing a large crystal. However ordinary silicon wafers can be made as large as three to five inches in diameter).

The above-mentioned alignment operations should be done in such a manner that both chip and filter, or both mask and wafer, be aligned with each other with a positional accuracy of one micro-millimeter or less over the entire surfaces of these objects. In particular, since the accuracy should be maintained over the entire surfaces, the positioning operation should be done by observing a plurality of locations (usually two places on both left and right) of the objects. As mentioned in the foregoing, however, the above-mentioned chips or wafers are 20 mm square at the largest, so that the observing points on the objects are separated by 20 mm at the most. It is impossible to dispose a plurality of microscopes in this narrow space interval. Particularly, when the accuracy required in positioning objects becomes higher, the microscopes are required that have high image resolution, and lenses of high resolution should inevitably have a large aperture, which, in turn, tends to increase the diameter of the lens barrel. On account of this, it becomes all the more difficult to dispose the microscopes in such a narrow space interval. For instance, when the positioning accuracy is determined at one micro-meter or less, a numerical aperture (N.A.) of an object lens in the microscope is required to be 0.2 and above, and when the working distance is set at 20 mm, the lens barrel of the object lens becomes as large as 20 mm and above with the consequence that it is impossible to observe two object points at an interval of less than 20 mm.

FIGS. 1A and 1B of the accompanying drawing illustrate an apparatus and method for observing two adjacent regions, which might be devised most easily.

In the drawing, a reference numeral 1 designates a CCD chip, and a reference numeral 2 designates a tricolor separation filter. These CCD chip 1 and the color filter 2 are superposed on each other with respect to the optical axis of a microscope 3.

In the state shown in FIG. 1A, the right end of the chip 1 and the color filter 2 are observed for alignment. Subsequently, the chip 1 and the color filter 2, as an integral whole, are shifted to the right direction in the drawing, or the microscope 3 is moved to the left direction, as shown in FIG. 1B, so that the left end of the chip 1 and the color filter 2 may be observed for alignment. By repetition of this operation a few times, both chip 1 and color filter 2 can be aligned with satisfactory accuracy over their entire surfaces. This method, as is understandable from the above description, takes time to achieve the positioning, and therefore cannot be said to be an entirely satisfactory solution to the problem.

An alternative apparatus and method might be suggested in which two microscopes 3, 3 are disposed with their object lenses inclined to the surface of the chip 1 and the color filter 2, with a line perpendicular thereto as the axis of symmetry. While this apparatus has an advantage of reducing time for the positioning operation in comparison with the previously described apparatus and method, it still has a problem of accuracy in positioning the objects because the object surface is observed from a inclined direction. Therefore, this apparatus and method, too, cannot be said to be entirely satisfactory for solving the problem.

SUMMARY OF THE INVENTION

The present invention has been made with a view toward solving above-mentioned problems which characterize known observation methods and devices for aligning two objects.

It is therefore the primary object of the present invention to provide an observation device for simultaneously observing, by the use of a plurality of microscopes, a plurality of mutually adjacent regions on at least two objects which are superposed one on the other with respect to the direction of the optical axis.

With a view to attaining this object, the present invention provides device construction in which a magnifying image projecting lens is interposed between the plurality of microscopes and the objects as superposed.

DETAILED DESCRIPTION OF PREFERRED EMBODIMENTS

In the following, the present invention will be explained with full detail in reference to the accompanying drawing.

Figure 1A:
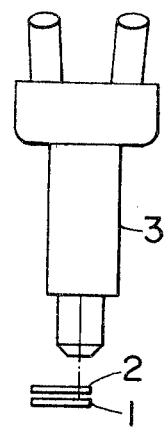
FIGS. 1A and 1B and FIG. 2 illustrate apparatus and methods of observing two adjacent points on objects with high image resolution.
Figure 1B:
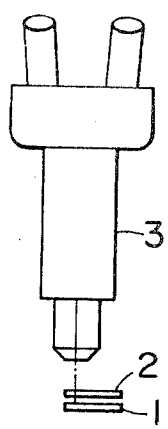
Figure 2:
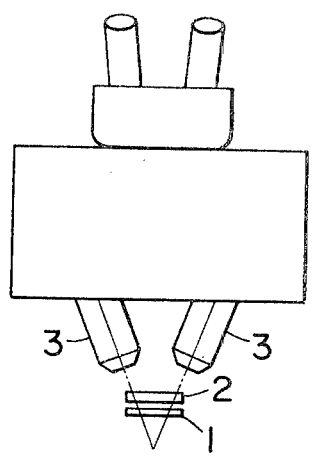
Figure 3:
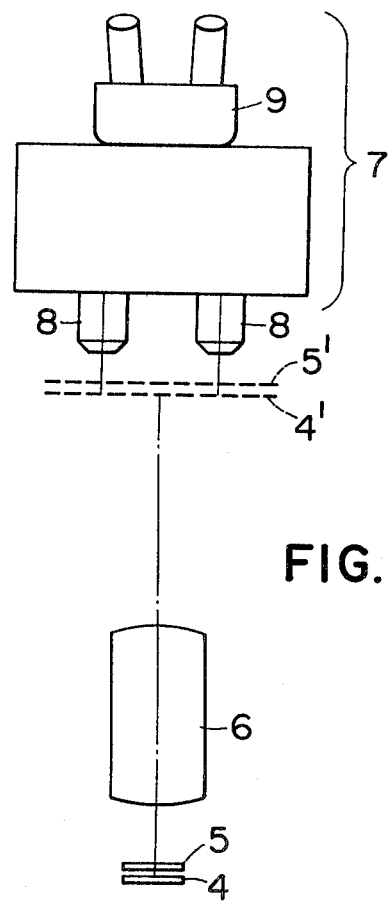
FIG. 3 shows one preferred embodiment of the optical layout of the observation device according to the present invention.

Referring to FIG. 3 showing a first embodiment of the optical layout of the observation device according to the present invention, a reference numeral 4 designates a CCD chip or similar object, and a numeral 5 refers to a tri-color separation filter or similar object. This color filter 5 is to be aligned on the CCD chip 4 with good accuracy. Incidentally, the chip 4 and the color filter 5 may be disposed either in contact or in close proximity to each other. A numeral 6 refers to a magnifying image projecting lens having a high image resolution and a large field. With this magnifying and image projecting lens 6, there can be formed enlarged images 4' and 5' of the chip 4 and the color filter 5, respectively. In view of the fact that these images are enlarged ones, the space intervals between the left and right sides of the chip 4 and the color filter 5 are naturally widened. A reference numeral 7 denotes microscope. A reference numeral 8 designates microscope objectives with their optical axes parallel to each other unlike the example of FIG. 2, and 9 refers to a binocular. This type of microscope is able to observe points separated by a wide space interval between the objectives, 8, 8. Therefore, by using the observation device of the present invention, it is possible to observe both left and right ends of the chip 4 and the color filter 5 at the same time and with high image resolution. Further, since the observation device according to the present invention uses the magnifying and image projecting lens 6 having a large field, it has a longer working distance than in the case of using the microscope alone. In general, a lens having a large field size has a longer focal length, while a lens having a longer focal length has a longer working distance. As a consequence of this, alignment of the object points can be done more advantageously than in the case of observing them directly through the microscope.

Figure 4:
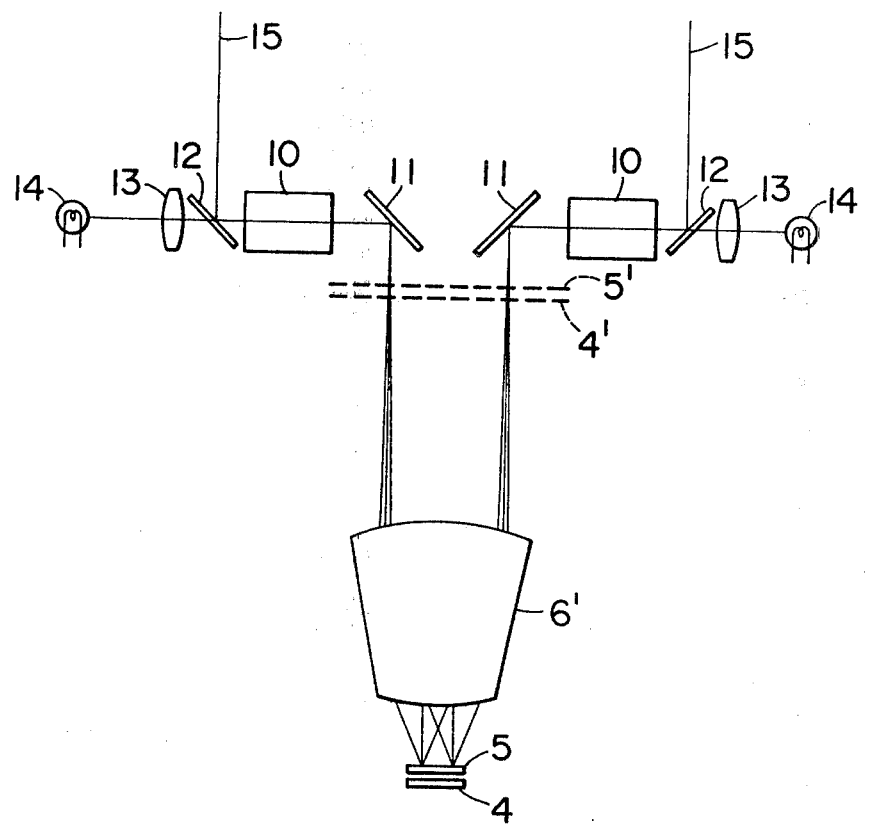
FIG. 4 shows another preferred embodiment of the optical layout of the observation device according to the present invention.

FIG. 4 shows the second embodiment of the optical layout according to the present invention. In this embodiment, there is used a magnifying image projecting lens 6' which is so-called "telecentric" at both object and image sides. A reference numeral 10 designates a microscope objective, 11 a total reflection mirror, 12 a semitransparent mirror, 13 an illuminating condenser lens, and 14 an illuminating light source.

Light from the illuminating light source 14 passes along the optical path defined by the condenser lens 13, the objective 10 of the microscope, the total reflection mirror 11, and the magnifying image projecting lens 6', and illuminates positioning marks (not shown) on the objects 4, 5 to be aligned. Since the magnifying image projecting lens 6' is telecentric at both object and image sides, the principal rays of the illuminating light vertically impinge onto the objects 4, 5, and are reflected by the objects to trace back the original light path. The objects 4, 5 as illuminated are magnified and projected by the magnifying image projecting lens 6' to be the projected images 4', 5'. Since the magnifying image projecting lens 6' is telecentric at both object and image sides, the light beam to form these images becomes symmetrical to the optical axis of the objective of the microscope, and sufficient amount of light passes therethrough. The light is further reflected at the semitransparent mirror 12 and led to a light path 15 toward an eye piece (not shown).

Although the objects 4, 5 are usually spaced apart from several to several tens of micro-meters, it is desirable that both be brought closer within the depth of focus of the magnifying image projecting lens 6'. Since the lens 6' is telecentric on both sides, the magnification of the object images 4', 5' become equal, even when these object images are spaced apart, hence the positioning operation can be done easily. When the lens is non-telecentric at both sides, the magnification of the object images 4', 5' are slightly different, which causes alignment errors between the images 4' and 5'. Even in the presence of such positioning error, however, the micropositioning is still possible by a method wherein the alignment is performed in such a manner that the positioning error may be of the same magnitude and their direction is opposite each other on both left and right sides, although such method lacks convenience.

Further, instead of the light source 14, there may be used light which has been guided by a light guide. Furthermore, it is feasible that the total reflection mirror 11 is replaced by a semi-transparent mirror, and an illuminating light beam for positioning operation be impinged from above the semi-transparent mirror 12. In this case, the semi-transparent mirror 12 may be instead a total reflection mirror.

Though in this embodiment, real images 4', 5' formed by the image projecting lens 6' are observed by use of the microscope 7, it is also possible to observe virtual images.

As stated in the foregoing, the present invention makes it possible to simultaneously observe two adjacent points on very small objects to be aligned, whereby there accrue such advantages that efficiency in the positioning operation is improved, the working distance to the object can be made longer, and the positioning mechanism can be easily laid out.

What I claim is:

1. A device for simultaneously observing a plurality of sets of adjacent regions respectively on at least two objects which are superposed on each other with respect to the direction of the optical axis of said device, any one set of said adjacent regions respectively on said objects being spaced from other sets of said adjacent regions in a direction generally perpendicular to the optical axis of said device; said device comprising:
    (a) a single magnifying image projecting optical system for forming enlarged and projected images of said objects including said sets of said adjacent regions; and
    (b) a plurality of microscopes disposed with their optical axes spaced by a distance greater than the space between said any of said sets of said adjacent regions on said objects, each said microscope being positioned to observe the enlarged and projected images of one said set of said adjacent regions.

2. The device as set forth in claim 1, wherein said magnifying image projecting optical system is telecentric at both sides of said objects and projected images.

3. The device as set forth in claim 1, wherein said magnifying image projecting system is telecentric at, at least the object side thereof.

4. A device for observing first adjacent regions respectively on each of a first object and a second object superposed on each other with respect to the direction of the optical axis of the device and for simultaneously observing second adjacent regions respectively on said first and second objects, said first regions being spaced from said second regions in the direction generally perpendicular to the optical axis of the device, said device comprising:
    (a) a single magnifying image projecting optical system for forming enlarged and projected images of said objects, including said first regions and said second regions; and
    (b) a first microscope and a second microscope disposed with their optical axes spaced by a distance greater than the space between said first regions and said second regions, said first microscope observing on said objects said enlarged and projected images of said first regions and said second microscope simultaneously observing said enlarged and projected images of said second regions.

* * * * *

UNITED STATES PATENT AND TRADEMARK OFFICE
CERTIFICATE OF CORRECTION

PATENT NO. : 4,417,789

DATED : November 29, 1983

INVENTOR(S) : ICHIRO KANO

It is certified that error appears in the above-identified patent and that said Letters Patent is hereby corrected as shown below:

Column 1

Line 25, after "diameter", delete ")".

Column 2

Line 17, change "a" to --an--.

Line 53, change "in" to --with--.

Column 3

Line 33, change "objective" to --objectives--.

Signed and Sealed this

Tenth Day of July 1984

[SEAL]

Attest:

GERALD J. MOSSINGHOFF

Attesting Officer    Commissioner of Patents and Trademarks